United States Patent [19]

Larsen

[11] Patent Number: 5,052,494

[45] Date of Patent: Oct. 1, 1991

[54] EXPLOSION SUPPRESSION DEVICE

[75] Inventor: Theodore E. Larsen, Edina, Minn.

[73] Assignee: Advanced Innovations, Inc., Minn.

[21] Appl. No.: 504,386

[22] Filed: Apr. 4, 1990

[51] Int. Cl.$^5$ .............................................. A62C 37/12
[52] U.S. Cl. ....................................... 169/60; 169/26; 169/66
[58] Field of Search ........................ 169/28, 26, 39, 40, 169/19, 54, 56, 60, 61, 66; 137/68.2, 70, 71

[56] References Cited

U.S. PATENT DOCUMENTS

| | | | |
|---|---|---|---|
| 2,783,845 | 3/1957 | Mathisen | 169/54 |
| 3,091,365 | 5/1963 | Horner et al. | 169/26 |
| 3,831,682 | 8/1974 | Calcaro | 169/40 |
| 3,971,443 | 7/1976 | Zenker | 169/39 |
| 4,248,309 | 2/1981 | Hofle et al. | 169/40 |
| 4,281,717 | 8/1981 | Williams | 169/66 |
| 4,356,868 | 11/1982 | Bentley et al. | 169/26 |
| 4,487,266 | 12/1984 | Gillis et al. | 169/51 |
| 4,815,694 | 3/1989 | Ferren et al. | 169/26 |
| 4,889,189 | 12/1989 | Rozniecki | 169/26 |

Primary Examiner—Joseph F. Peters, Jr.
Assistant Examiner—Virna Lissi Mojica
Attorney, Agent, or Firm—James R. Cwayna

[57] ABSTRACT

A device for suppressing explosions that may occur in process enclosures such as those for handling of grain, manufacture of pharmaceuticals and similar processes. The unit includes a cylindrical housing having one end thereof communicating with the process area and the opposite end thereof communicating with a pressure vessel, with a fire retardant containing canister slidably arranged therebetween and a valving member in sealing position against the pressure vessel. The canister is in controlling position to open the valving member, under the action of and purposely dependent upon a predetermined level of pressure increase within the process area, and thus to release pressure from the pressure vessel. The canister includes a detonating device which will cause explosion of the canister simultaneously with release of the pressure and dependent upon release of the pressure from the vessel. Detonation of the canister combined with the release of pressure from the vessel results in rapid and complete dispersal of the suppressant substance into the process area. The device operates independent of any electrical apparatus so as to form a self contained and intrinsically safe unit.

17 Claims, 5 Drawing Sheets

1

EXPLOSION SUPPRESSION DEVICE

FIELD OF THE INVENTION

This invention relates generally to systems utilized in suppression of explosions and more specifically to those which are responsive to increase in pressure in a process area resulting from explosive development of a fire ball, for the release and dispersal of fire suppressant material into a process area by means of the release of pressure from a storage vessel.

SHORT SUMMARY OF THE INVENTION

Applicant's invention is a totally non-electric device for sensing of pressure changes and for providing rapid injection and distribution of a fire suppressant material into a process area upon increase in pressure in the process area, which increase in pressure is caused by explosive development of a fire ball.

The invention consists of a self contained unit which combines a source of pressurized gas integral thereto, a cylindrical housing communicating with the source of pressurized gas at one closed end and the process area at the other open end, a valving element arranged for cooperation with a suppressant containing canister to control pressure entrance into the cylindrical housing, the combination providing for expulsion of suppressant material from the canister into the process area upon predetermined increase in the level of pressure within the process area. The canister or design designated portions integral therewith are slideably arranged within the cylindrical housing for movement upon respective increase in pressure operating on the surface areas at opposite ends thereof, with controlling communication to a mechanical lever system positioned to operate the valving element to admit stored pressurized gas to the cylindrical housing at one end of the canister, and which relatively simultaneously therewith causes the actuation of a detonating device within the canister for rupture thereof. Valving and release mechanism for pressure within the vessel are arranged in adjustable position for actuation by movement of the canister or design designated portions thereof within the cylindrical housing upon a predetermined increase in pressure within the storage enclosure. The canister is provided with its own detonating charge to provide a two-fold dispersal reaction to increases in pressure in the process area. The operative lever system is actuated over center by movement of the canister or design designated portions thereof, and rotates under the further action of pressure to initiate detonation of an explosive charge in the canister, which in sequence with opening of the pressure vessel produces a combined action of air movement and explosive force for the rapid distribution of the suppressant material into the process area.

The mechanical pressure responsive operation of the unit eliminates the need for electrically controlled or initiated systems.

The suppressant containing canister, detonation mechanism and lever tripping mechanism to control pressure inlet from the pressure vessel are loadable into the cylindrical housing through a sealable opening, with the surface at one end of the canister in position to react to increases in pressure in the process area and the other end of the canister being positioned to operate the lever tripping mechanism which in turn initiates explosive action to rupture the canister. Obviously a number of these explosion suppressant devices may be arranged about a material processing enclosure depending upon the size of the enclosure, and due to freedom from electrical dependency the basic requirements for installation of each unit is mechanical mounting in a position to react to increases in pressure within the process area.

BACKGROUND AND OBJECTS OF THE INVENTION

Applicant is familiar with various types of explosion suppression devices and has found that such units incorporate systems which are electrically dependent for converting the detection of a pressure rise into a suppression action. Examples of electrically dependent systems include the Patent to Gillis, U.S. Pat. No. 4,487,266; the Patent to Bagno, U.S. Pat. No. 2,867,282; and the Patent to Williams, U.S. Pat. No. 4,281,717. Other systems such as interconnected extinguishers illustrated in the Patent to Dabor, U.S. Pat. No. 3,896,881 and Thery, U.S. Pat. No. 4,194,572 include interlock arrangements which require electrical supervision. The dependence on an electrical source presents problems due to the potential for failure of the electrical supply and the possibility of damage to one or more of the interconnecting wires which typically extend beyond the point at which the suppressant container is physically located. Such problems necessitate the use of battery backup systems and electrical supervision of interconnecting wires. Further, electrical interconnections utilized in association with hazardous industrial processes require conformance to safety regulations which significantly increase the cost of system installation. To avoid this problem a device such as that described in Gillis utilizes batteries located at each suppressant container to provide the power necessary to operate the system. While this eliminates interconnecting wires, it leaves the system totally dependent upon the batteries of each unit and upon plant personnel for monitoring battery conditions.

With applicant's unit a self contained, pressure responsive and pressure actuated unit is provided which eliminates any reliance upon electricity or electrically associated sources.

It is therefore an object of applicant's invention to provide an explosion suppression device which provides a non-electric self contained unit responsive to increases in pressure within a protected area for release and expulsion of fire retardant substances into the area for the suppression of explosions and retardation of fires which may result from such explosions.

It is a further object of the applicant's invention to provide a non-electric self contained, explosion suppression unit having a source of stored pressurized gas connected therewith, which upon valve opening will act to cause expulsion of retardant material into a process enclosure being protected against explosions resulting from ignition of combustible materials within the enclosure.

It is still a further object of the applicant's invention to provide an explosion suppression unit which is adaptable for mounting onto or into various process structures without electrical interconnections, which unit incorporates a common-type housing having a canister therein which canister houses a quantity of fire suppressant and retardant material which material is explosively released upon detonation of the canister for distribution into the area to be protected.

It is still a further object of the applicant's invention to provide a non-electric self contained explosion suppression unit, incorporating what may be termed a common housing into which interchangeable and replaceable canisters may be slideably mounted through one sealable end of the housing, such canisters or design designated portions thereof moveable upon application of pressure thereto, with one end of the housing being open and exposed to the protected enclosure and the other sealable end of the housing being connected to a stored source of pressurized gas via valving mechanism controlled solely by movement of the canister or design designated portions thereof to release pressure from the source for action against the canister.

It is still a further object of the applicant's invention to provide a non-electric self contained explosion suppression unit having a cylindrical housing and a retardant containing canister slideably mounted therein, which canister is provided with a self contained explosive device and which explosive device is actuated upon predetermined movement of the canister and cooperating mechanisms thereof, to rupture the canister and expel the retardant material contained in the canister for distribution into the protected enclosure.

A further object of the applicant's invention is to provide a non-electric self contained explosion and fire retardant device which can be readily serviced or restored to service after discharge without dismantling of the equipment, in that the extinguishant canister is accessible and can be replaced through a removeable or hinged cover at one end of the cylindrical housing, which cover also allows access to the pressure source controlling mechanism which after repositioning or replacement permits the pressure vessel to be repressurized on site with proper high pressure air or non-combustible gasses.

Yet a further object of the invention is to provide optional interface with any process equipment power source through means of a pressure line connected between the pressure vessel of applicant's device and pressure operated switching means located in close proximity to process power control equipment to shut down or otherwise control operation of machinery in the event of a discharge of the explosion suppressant material.

It is an additional object of the applicant's invention to provide at least two distinct methods of distributing suppressant and extinguishant into a protected area, which two methods acting together provide extremely rapid and complete distribution of the suppressant, but wherein either of the two methods acting alone will deliver a quantity of agent into the protected area.

It is a further object of applicant's invention to provide a means to automatically compensate for changes in pressure between the interior and exterior of the protected enclosure, as may be due to fluctuations in atmospheric pressure, in order to prevent either false actuation of or failure to actuate the explosion suppression unit's pressure responsive mechanism.

It is a further object of the applicant's invention to safely contain all pressures generated within the housing of the unit, whether caused by pressure released from the pressure vessel or that due to detonation of explosive within the canister, and direct the resulting force of these pressures axially along the cylindrical housing and out the open end thereof into the protected enclosure or area.

It is still a further object of the applicant's invention to provide an explosion suppression system which provides a number of non-electric self contained units which are responsive to increases in pressure within a protected area for release and expulsion of fire retardant substances into the area wherein the actuation of one of the units will rapidly increase the pressure within the area to initiate response of the other such units and providing an effective pressure interlock between units.

These and other objects and advantages of the invention will more fully appear from a consideration of the accompanying drawings and disclosure.

SHORT DESCRIPTION OF THE DRAWINGS

FIG. 1 is a schematic illustration of a process enclosure area such as a grain elevator with a single explosion suppression device embodying the concepts of applicant's invention shown mounted on the exterior thereof, and illustrating a pneumatic line for connection to a control switch which cooperates with the applicant's suppression device to interrupt operation of machinery which is illustrated as being within a safe area;

Figure 8:
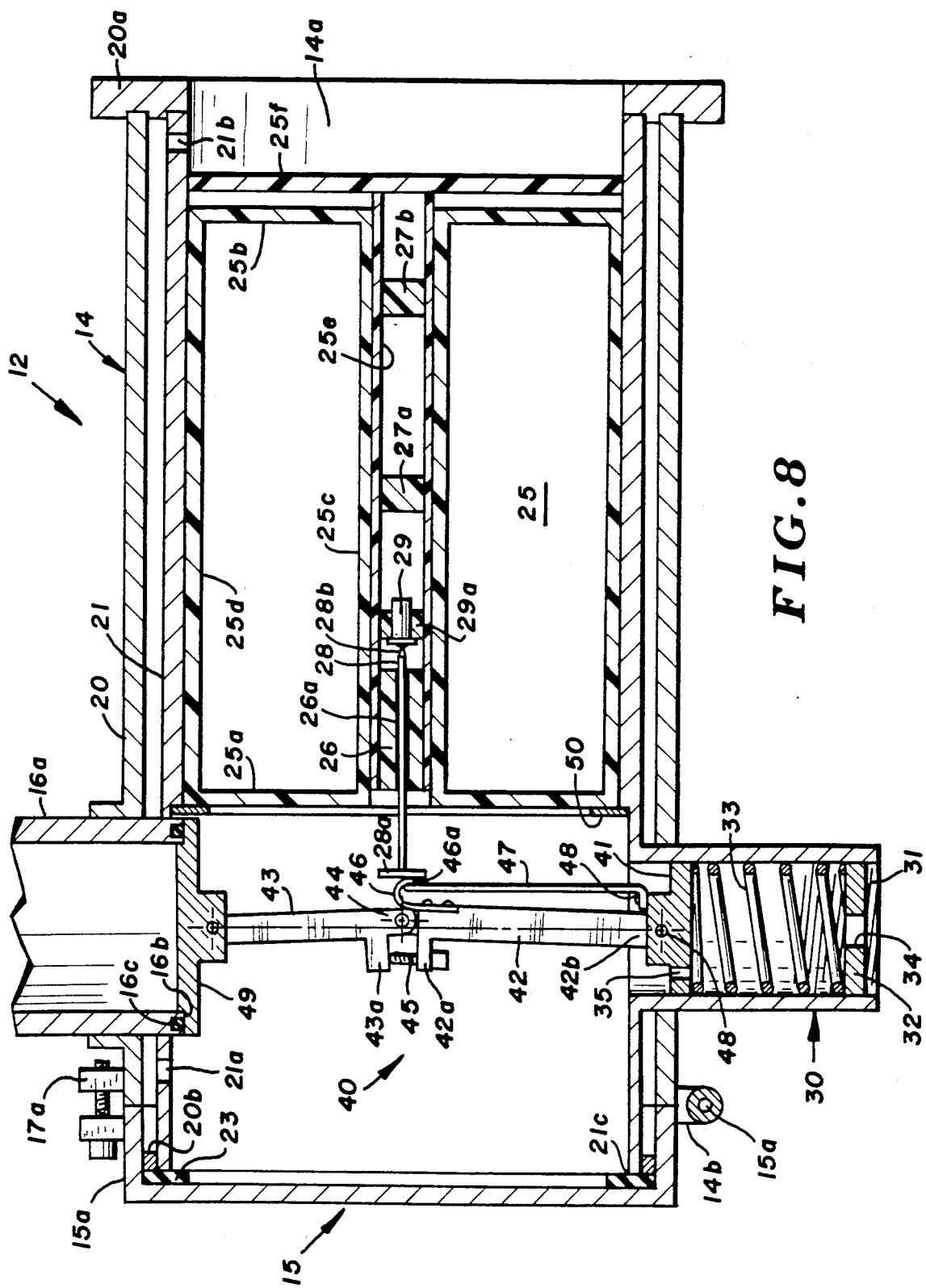
Figure 9:
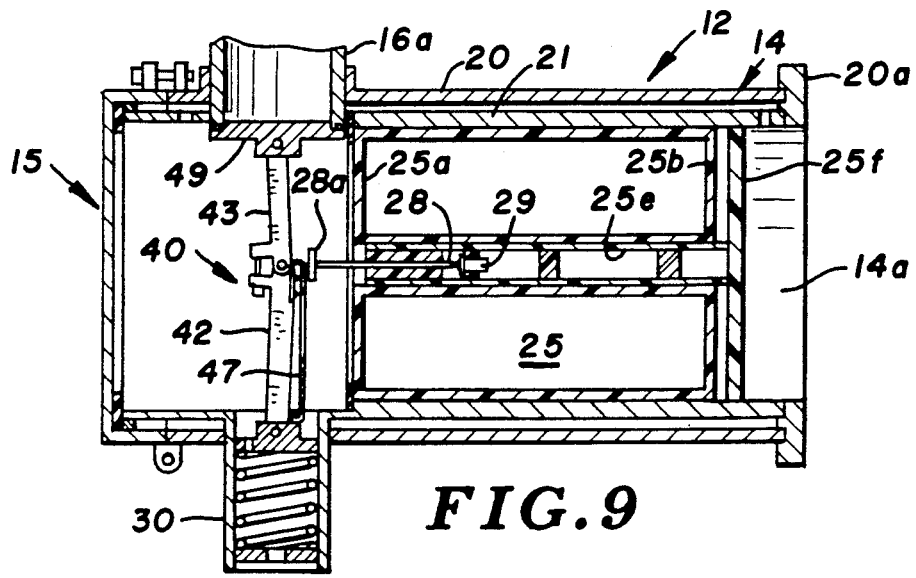
Figure 10:
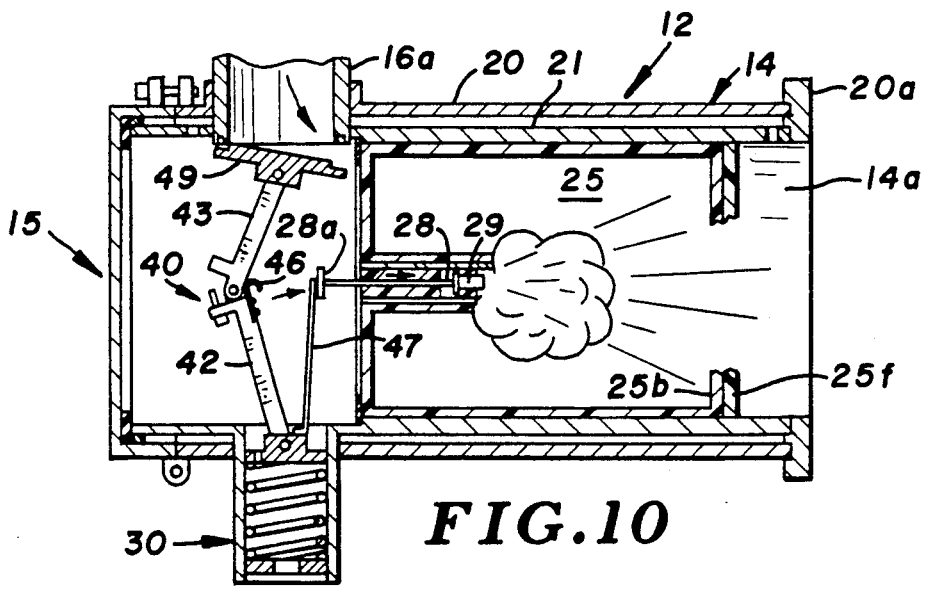
Figure 11:
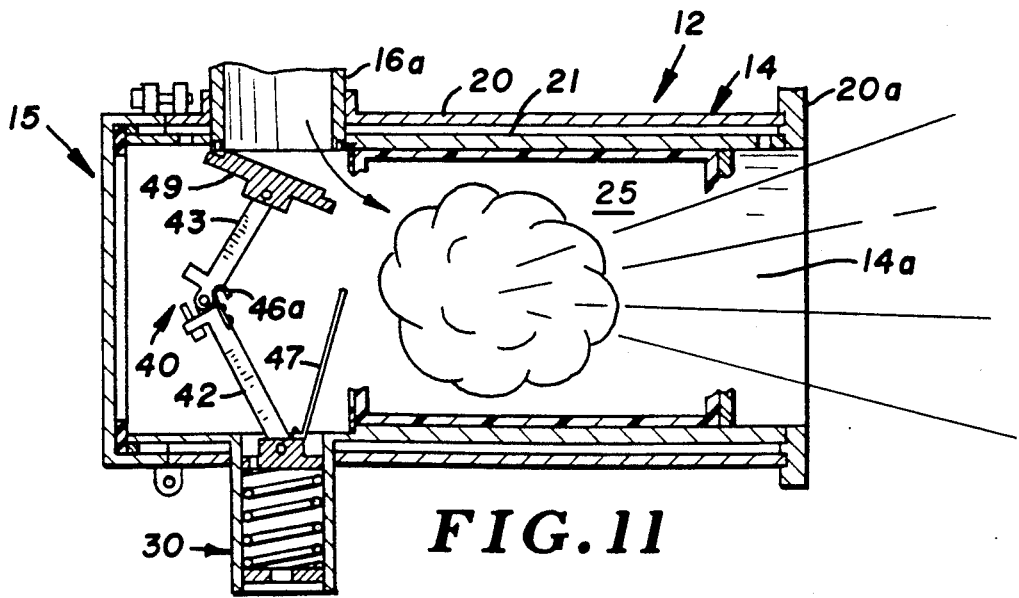

FIG. 8 is a view similar to FIG. 4, again being a vertical, longitudinal section taken substantially through a second form of the unit embodying the concepts of the applicant's invention; and, FIGS. 9, 10 and 11 are views similar to FIG. 8 again illustrating the sequential movements of the mechanisms involved in this second form of the invention and again ilustrating the steps from a non-explosive condition through suppressant discharge into the protected area.

DESCRIPTION OF A PREFERRED AND MODIFIED FORM OF THE INVENTION

Figure 1:
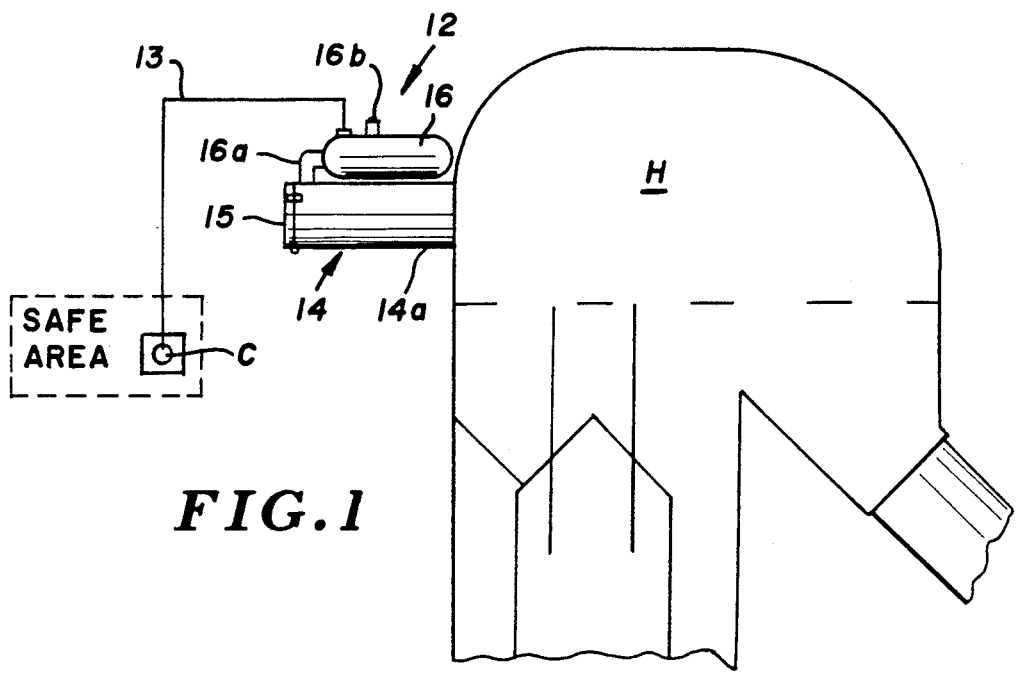

As illustrated in FIG. 1, applicant's explosion suppressant device is generally designated 12 and is illustrated in attached position to the exterior of a grain elevator head H with the flow of material into and out of the process enclosure being designated by the respective legs and arrows within the head H with the unit 12 being inter-connected to a process mechanism control device by a pressure line 13. This safe area is so designated and may be an area devoted to process machinery which may be electrically powered. This particular pressure line 13 then illustrates the applicability of means for interrupting power to remote machinery and other operations inherent to grain elevators or other processing units. As illustrated applicant's unit includes a cylindrical type housing 14 having a loading end 15, a pressure vessel 16 integral to housing 14 with one end 14a of the housing 14 being in position to sense internal pressure of the grain elevator head H.

A grain elevator head H is selected and illustrated as simply one of a number of choices relating to a process situation. Obviously many processes include material transfers, intermediate storage, etc. of material wherein the material is flammable, and due to frictional heating or other ignition sources may result in an explosion and accompanying pressure increase within the process enclosure. With the applicant's unit the increase in pressure is sensed and fire suppressant materials are projected into the process enclosure with such timing and velocity so as to overtake a developing fire ball before it can exert destructive pressures within the process enclosure.

The optional pressure line 13 and control C of FIG. 1 are included to illustrate that applicant is aware of the desireability in many of these situations to interrupt the operation of process machinery when an explosion occurs. With the applicant's unit a loss of pressure in the pressure vessel 16 which is simultaneous with expulsion and distribution of the fire suppressant material will cause a loss of pressure in line 13 to thus operate a pneumatic switch or control C which may be interfaced with the power supply to operating equipment to cut off such power. Although this particular portion of the applicant's device is designated as an optional feature, it is an attribute of the invention which may be of considerable importance in some instances.

Although the applicant's unit may be interfaced with electrical equipment as described, the electrical side of the interface is to satisfy the electrical nature of the process machinery. From the standpoint of applicant's invention the pneumatic interface may be made with any form of power and it should be noted that no electrical power and thus no electrical connections are required for operation of applicant's unit. This is of importance for a number of reasons, including the fact that electrical installation code requirements are particularly high when wiring is located in explosive atmospheres, and electrically dependent safety equipment must have electrically supervised wiring and be provided with battery backup to protect against loss of power.

In FIG. 1, only one suppressant unit is illustrated in conjunction with the grain elevator head H. Obviously a plurality of such units may be incorporated dependent upon the size of the processing area and these units may be positioned at any location with regard to the processing area as long as the pressure receiving, open end of the housing 14 is in pressure reactive position to the processing or processed material area.

One particular aspect of applicant's unit should be considered when utilizing a number of such units with regard to a single processing area. In the various positions logical for placement of applicant's units it should be obvious that pressure transmission may not occur simultaneously to all of the units due to physical obstructions and other factors. However, applicant's units actually form a pressure interlock between each other. As the pressure in a process area increases it may activate one of the units but the pressure may be only slowly transmitted to the others of such units. Activation of one of applicant's units will cause additional pressure to be introduced along with suppressant into the processing area. This increase in pressure caused not only by the fire ball evolution but the increased pressure introduced by actuation of one of applicant's units will increase pressure within the processing area and therefore will serve to more rapidly distribute or transmit pressure to the other of such units for a more rapid activation thereof than would result simply from pressure increase due to fire ball expansion.

Exterior configurations of applicant's unit 12 are illustrated throughout the various figures and applicant has chosen to illustrate the same in cylindrical or circular cross sectional shape. It should be obvious to those skilled in the art that a housing of any geometric cross section may be employed without departing from the scope of the invention.

It should be noted that the two units illustrated in the accompanying drawings basically include the same exterior configurations with certain aspects of the interior elements provided therein also utilizing the same parts and therefore the same number or other indicia is utilized to identify those elements which are identical in the various views.

Figures 2, 3:
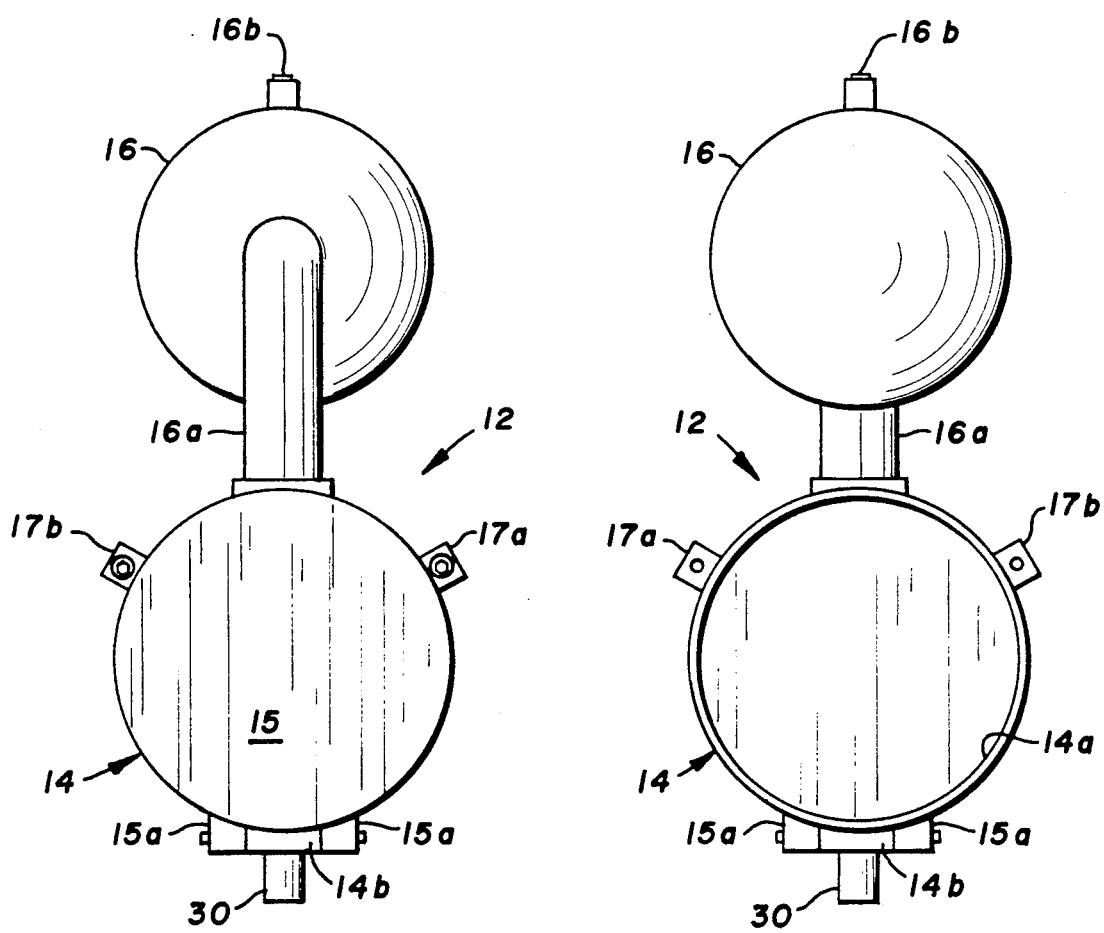
FIG. 2 is a view taken from one end of the applicant's invention illustrating the breech or loading end of the housing thereof.
FIG. 3 is a view similar to FIG. 2 taken from the opposite end of the unit.

Applicant's unit includes a housing 14 having a breech or loading end including a cover plate 15 hingedly attached to barrel 14 through a hinge construction 15a, 14b illustrated at the underlying portion of the end of cylindrical housing 14. Bolted locking devices 17a-17b are provided to illustrate a typical method for closing lid 15 onto the housing 14. The outlet end 14a of the housing 14 is, as illustrated in FIG. 3 and the various other Figures a simple open ended cylinder which is affronted to the process area to be monitored. As also illustrated, pressure vessel 16 is simply a vessel of sufficient volume and strength to retain a predetermined amount of air or non-combustible gas, adapted with a re-charging inlet 16b arranged on one surface thereof with a large interconnect tube 16a interconnecting the vessel 16 to the cylindrical housing 14. As illustrated, this inlet 16a from pressure vessel 16 is adjacent one end of the housing 14 to accommodate the placement therein of the operative portions of the unit.

Figure 4:
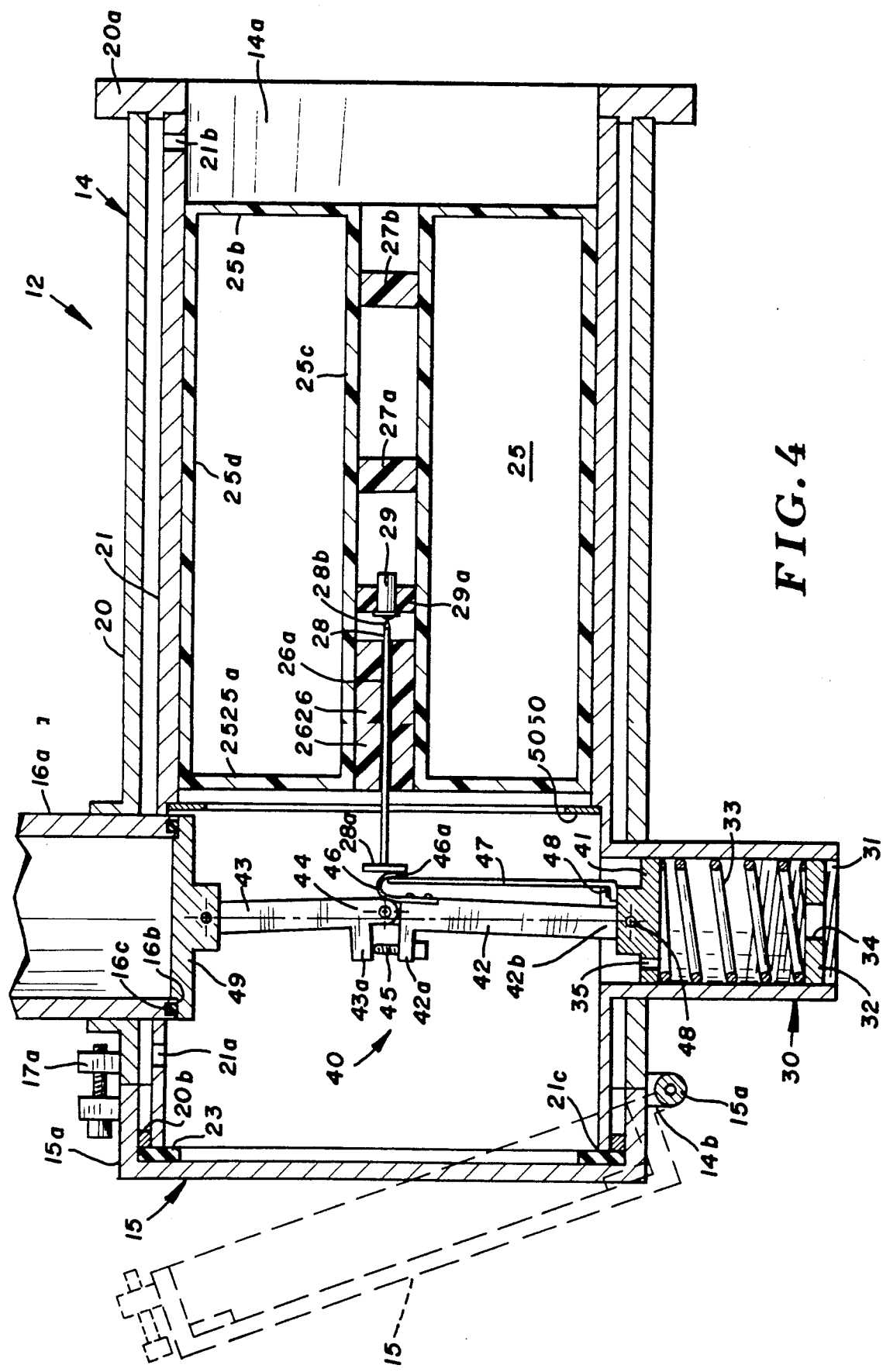
FIG. 4 is a vertical, longitudinal section taken substantially through a first form of the unit embodying the concepts of applicant's invention for detonation and discharge of the suppressant material.
Figure 5:
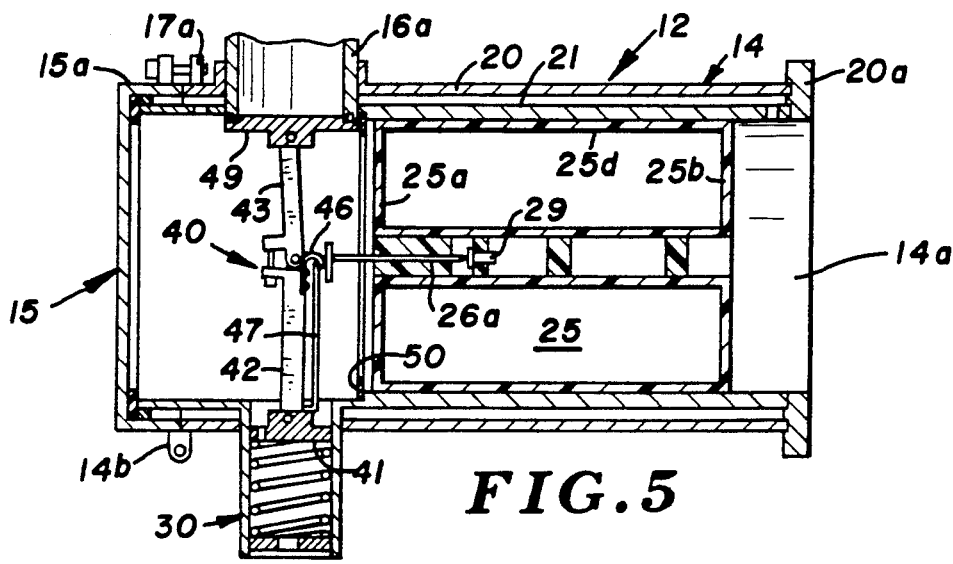
FIGS. 5, 6 and 7 are views similar to FIG. 4 which illustrate sequential movements of the mechanisms involved in this first form of the invention from what may be termed a safe condition through suppressant release condition.
Figure 6:
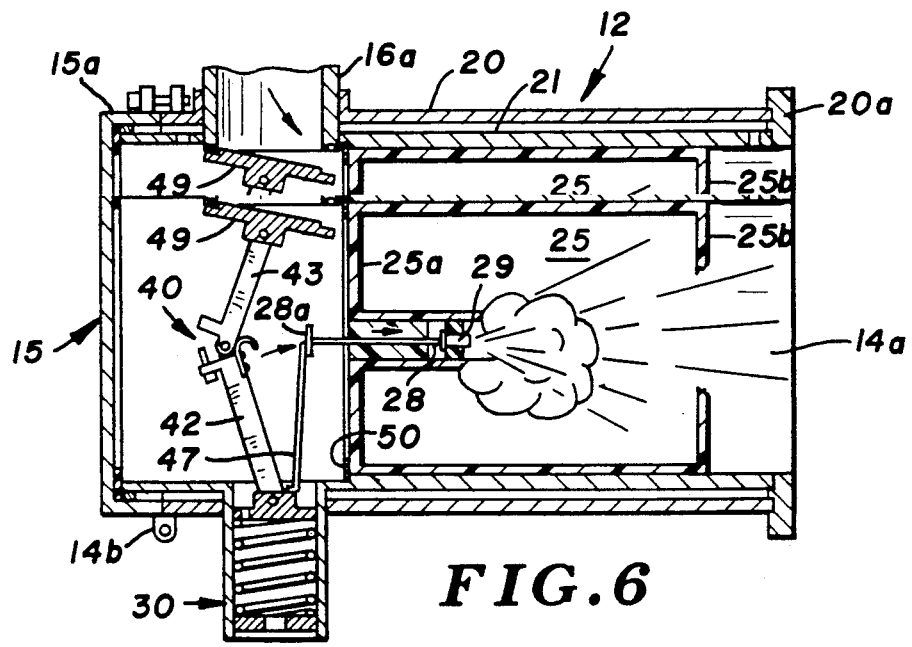
Figure 7:
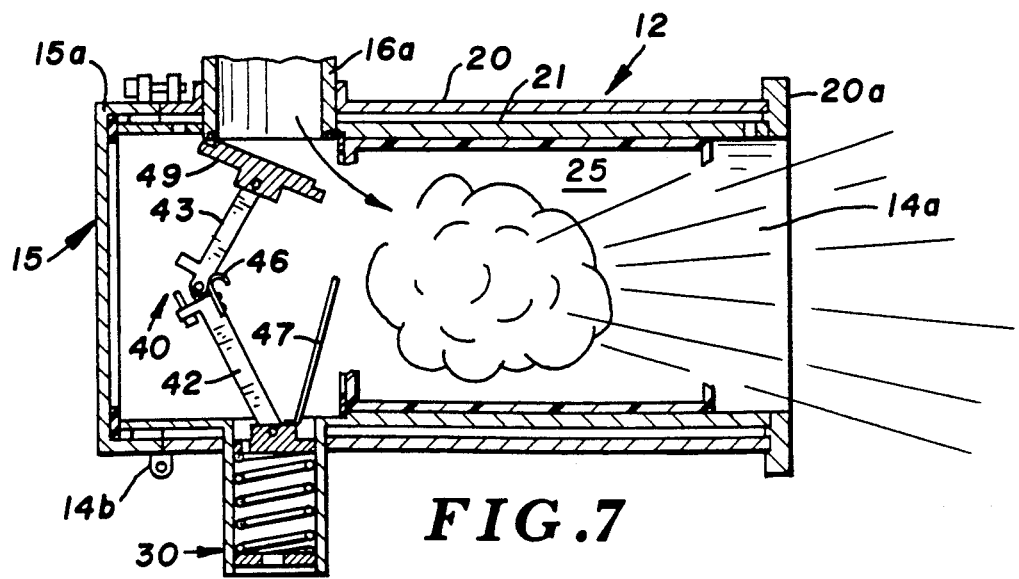

FIG. 4 is a longitudinal, vertical section of applicant's unit 12 and, as stated, various elements therein are common through all of the Figures, primarily FIGS. 4 and 8 and the sequential FIGS. 5, 6, 7, 9, 10 and 11. The cylindrical housing 14 includes a double cylinder construction comprising an exterior cylinder 20 and an interior cylinder 21. Spacing for cylinders 20, 21 is maintained through a mounting plate 20a and intermediate ring 20b at the respective ends of the cylinders 20, 21. It should be noted that a pair of apertures 21a-21b are formed adjacent the respective ends of the inner housing 21 and these apertures 21a-21b allow for pressure compensation and pressure balance between the respective ends of the unit 12 when the suppressant canister 25 is positioned within the interior of the inner housing 21. Obviously for this fact the various spacing and location members 22a-22b-22c must allow air to flow between the inner 21 and outer cylinder 20. The aspect of these openings 21a-21b is, as stated, to balance pressures from the pressure that exists within the processed area to both sides of the unit at a restricted rate.

The end cap 15 is, as previously stated, hingedly attached to the underlying portion of the outer cylinder 20 and is dish shaped in form, having a circular rim 15a integral with a flat bottom end 15b. Arranged and carried by the end cap 15 is a seal member 23 for abutment with the ultimate end 21c of the inner cylindrical housing 21. As previously stated the locking units 17a-17b are of the type that require a tool for opening. This is essential in such safety situations, because elements which may simply be hand locked or unlocked do not afford a sufficiently safe structure against an unauthorized person opening the unit. The requirement of a tool to open is therefore provided on applicant's device.

Communication line 16a from vessel 16 does, as illustrated in FIG. 4, extend through both of the cylindrical housings 20-21 and terminates in a flat seal retaining end 16b housing an O-ring or similar sealing member 16c for sealing against a valving plate to be described hereinafter. Diametrically opposite the communication line 16a is a pressure or biasing adjustment housing and housed adjusting device generally designated 30. This housing 30 again is cylindrical in shape and is internally threaded over at least a portion 31 thereof to provide for adjusting movement of a spring set plate 32 which functions and operates against a compression spring 33 within the cylindrical housing 30. The upper end of compression spring 33 will abut with another element of a bi-stable assembly which is designated in its entirety as over-center unit 40 and is described hereinafter. A tool receiving aperture 34 is formed in threaded plate 32 and this aperture opens what may be termed the cap end of the cylindrical housing 14 to atmosphere as a similar aperture 35 passes through plate member 41 which plate member forms one end of the over-center assembly 40.

The over-center assembly 40 includes a pair of pivotally connected links 42-43 pivotally connected to a common link member 44 intermediate the internal ends thereof with the opposite ends of such link members 42-43 being pivotally connected respectively to the aforementioned spring abutting plate 41 and valving plate 45 which is in position to seal against the aforementioned end 16b and seal 16c of the inlet connecting conduit 16a from the pressure vessel 16. Offset shoulders 42a-43a are provided at the commonly pivoted ends of the links 42-43 and an adjustment member 45 cooperates between these offset ends 42a-43a for initially setting the angular one-side-of-center or static position of the links 42-43. The operation of an over-center device is well known in many mechanical fields and a further explanation of the same is not considered necessary.

Arranged on what may be termed the lower link member 42 of assembly 40 is an outstanding latch or clip 46 having a downwardly depending tang 46a. Arranged adjacent to the plate pivoted end 42b of link 42 is a spring steel arm member 47 which extends from the aforementioned plate 41 upwardly to normally be in engagement with the tang 46a of clip 46 connected to the link member 42. It should be noted, and this is primary to the operation for release of the spring arm 47, that the pivot point of the link 43 is established by its connection at pivot pin 48 associated with plate 41 while the pivot point of spring arm 47 is offset with respect thereto and is formed at the right angle corner 49 of the spring arm 47. The operation of the unit, particularly the linkages and over-center arrangement, is as illustrated in the sequential steps of FIGS. 5, 6 and 7. As the linkages 42-43 are brought to a center point being on the common vertical axis between the diametrically disposed inlet tube 16a and adjustment housing 30, spring member 47 is retained by the hook 46 tang 46a. After even minimally crossing this axis, pressure within the vessel 16 will force the linkages to collapse as best illustrated in FIG. 7. It is from the axially aligned position and therepast that the respective pivot points and lengths of the link 42 and spring arm 47 allow the spring arm 47 to be released and provide a striking force to a detonator structure described hereinafter in conjunction with a description of the aforementioned suppressant containing canister 25. Obviously the amount of force required to trip this over-center linkage for any given tension in spring 33 will be dependent upon its initial angle of offset with regard to vertical which is attained by adjustment of element 45.

The adjustment housing 30 provides means for adjusting tension which forces the over-center arrangement against seal 16c located in end 16b of conduit 16 and obviously this adjustment is obtained by tightening or loosening of plate 32 against compression spring 33 which thereafter operates against the over-center linkage plate 41 slideably received within the housing 30. In this manner then the initial force to bring the unit to its actual center position is controlled by the functions of the adjustment screw 45 operating between the links 42-43 and the pressure exerted by the spring 33 against plate 41.

In the form of FIGS. 1, 5, 6 and 7 it should be noted that the over-center action is a function of dual mechanics in that the initial, bringing to center force, is provided by canister 25 movement, and once the linkage has even minimally crossed the center situation collapsing force is provided by the pressure of the gas within the vessel 16 upon plate 45 to further the now unlocked movement of the over-center linkage arrangement.

Canister 25 is of a rupturable material and is arranged for sliding movement within the inner diameter of the inner housing 21.

Internally of the inner cylindrical housing 21 a removeable canister stop member 50 such as a C-ring is provided which will limit movement of the canister 25 but is removeable for replacement of the canister 25. The structure of canister 25 is to provide sufficient volume for retaining a quantity of suppressant but rupturable upon detonation of an interiorly housed detonating device in response to movement of a detonating pin caused by the action of the spring arm 47 thereagainst. Canister 25 therefore has an outer body 25d with closed ends 25a-25b and is generally cylindrical in shape to freely slide within the housing upon the application of pressure thereto or an increase in pressure thereto which pressure is received and applied against end 25b thereof due to the evolution of the fire ball within the process area. As illustrated, canister 25 includes an internal tube 25c which may include several internal supports 27a-27b and an internal longitudinal bearing unit 26 defining a passage 26a therethrough for sliding action of detonating pin 28 therein. Pin 28 is illustrated as providing an enlarged head 28a on an outboard end thereof and a detonating pin formation 28b on the opposite or interior end thereof with the end 28b affronting a normal explosive charge having a primer and quantity of explosive within a housing. Obviously a simple bullet primer 29 cooperating with a percussion type detonator surrounded by a small quantity of plastic explosives may satisfy this requirement and this unit is housed in an internal support member 29a within the interior of tube 25c.

As pressure increases within the process area this pressure will act against the surface 25b of the canister 25 and as the tube 25c and the internal structure including the explosive detonating housing 29a are secured to the tube 25c they will move therealong thus moving the detonating rod 28 against the outboard end of tang 46a of hook 46 to thereby move the over-center links to and slightly past the center position whereafter the pressure within the pressure vessel 16 continues the collapse of the over-center linkage and such movement tensions and then releases spring lever arm 47 from the tang 46a of hook 46 to strike the enlarged end 28a of detonating pin 28 therefore cause detonation of the primer and explosive charge within the unit 29. This internal explosion ruptures the fibrous canister and causes at least a certain amount of suppressant discharge through the open end 14a of the housings 14. Further and complete suppressant discharge is caused by the pressure entering the double walled housing 14 from the pressure vessel 16.

It should be noted that this entire operation is all pressure related with no electrically dependent actions employed. At this point it should be restated that the pressure within vessel 16 is now released for triggering the aforementioned optional control member C through the pneumatic tube 13 for interrupting power to operating equipment.

It should further be noted that, if a number of these units 12 are arranged around or within a processing area to be protected, although the evolving fire ball may have created sufficient pressure to activate one of such units other of the units may not have yet received this transmitted pressure to cause actuation thereof. With the additional pressure release from the pressure vessel 16 of one such unit, the pressure within the processing area is immediately increased which may result in sufficient pressure for actuating these several other units prior to the time when they would have been actuated by a normal increase in fire ball pressure. From this operation then it should be obvious that applicant's unit provides an interlock for operation of various units.

FIG. 8 discloses a slightly different form of the invention in which the canister 25 does not function as a moveable element but rather movement of the over-center linkage 42-43 is obtained through a piston 25f and rod combination 25e slideably moveable within the central tube 25c of the cylinder 25. In this particular Figure the canister 25 abuts with C-ring 50 and, as illustrated, the piston 25f is displaced a distance from the end 25b of the canister when the head 28a of detonating rod 28 abuts with the hook 46 and tang 46a of the over-center linkage structure 40. A stop 28b may be positively arranged on detonating pin 28 such that all of the elements are in their proper static positions and that upon pressure application to piston 25f the entire, what may be termed inner core structure is advanced against the over-center linkage assembly 40. In this instance then it is obvious that the longitudinal bearing housing 26, the housing 29a for primer and explosive 29 and the spacer elements 27a-27b are positively connected to the illustrated tubular structure 25e for movement therewith upon movement of piston 25f.

A comparison of the two illustrated assemblies of FIG. 4 and FIG. 8 disclose units which are identical in their operations to trip the over-center linkage structure 40 and cause the proper projection of the suppressant material from the canister 25 into the protected area.

It should be noted that the mass of piston 25f and the attached explosive assembly within tube 25e is of relatively small mass as compared to the mass of the structure when the entire canister must be moved.

It should be noted that applicant has provided for loading of the canister and over-center linkage through the breech 15 end of the housing 14 and once the operative elements including the canister 25 and over-center linkage 40 arrangements are in place inspection adjustment may be accomplished prior to closing of the closure cap 15 and locking the same through the locking elements 17a-17b. Again the sequential views of FIGS. 9, 10 and 11 illustrate the aforedescribed operation of the second form of the invention for over-center action and release of the pressure from vessel 16 for proper discharge of the suppressant into the process area.

It should be obvious that applicant has provided a new and unique explosion suppression device which is totally pressure responsive and pressure operative and which provides an interface to control mechanisms of operating machinery and an interface between similar pressure operated units for insuring proper operation thereof.

What is claimed is:

1. A device for projecting fireball suppressant material into a protected area in response to increases in pressure within such area whereby damage due to pressure increase from a developing fireball is reduced or substantially eliminated through fireball suppression, said device including:
   a. a longitudinally extending housing providing a first open end and a second end including means for closing the same;
   b. a pressure vessel communicating with said housing in close relation to said second end arranged and constructed for rapid introduction of pressurized gas into said housing;
   c. means controlling communication between said housing and said pressure vessel;
   d. suppressant containing canister receivable into said housing and positionable therein intermediate said valving means and said first open end of said housing;
   e. means for releasing suppressant from said canister; and,
   f. means associated with said communication controlling means and said suppressant releasing means being pressure responsive to increases in pressure within the protected area arranged and constructed to open said communication controlling means and actuating said suppressant releasing means upon an increase in pressure within the protected area whereby release of pressure from said vessel and release of suppressant cooperatively project the suppressant into the protected area.

2. The device as set forth in claim 1 and said means for controlling communication between said housing and said pressure vessel including a valve plate.

3. The device as set forth in claim 1 and said canister being formed of a fibrous, rupturable material.

4. The device as set forth in claim 3 and said means releasing suppressant from said canister including an explosive charge and primer within said canister.

5. The device as set forth in claim 4 and means for detonating said explosive charge including biased hammer means associated with said communication controlling means releasable therefrom upon opening of said communication means for biased reaction against said primer for detonation of the same and the associated explosive charge.

6. The device as set forth in claim 1 and said means for closing said second end of said housing including hinged door means positively lockable to said second end of said housing and sealing means intermediate said door means and said housing.

7. The device as set forth in claim 6 and said door means providing sufficient access to the interior of said housing for insertion of said canister, said communication controlling means and said means associated with said communication controlling means.

8. The device as set forth in claim 1 and recharging means provided on said pressure vessel for repressurization thereof.

9. The device as set forth in claim 1 and means for introducing air under atmospheric pressure between said canister and said second end of said housing 10. The device as set forth in claim 1 and passage means arranged and constructed to introduce air under pressure from the processing area into the area between said canister and said second end of said housing 11. The device as set forth in claim 10 and said passage means arranged and constructed to restrict the flow of air therethrough.

12. The device as set forth in claim 1 and said communication controlling means including:
 a. a pressure vessel closure member;
 b. an over-center linkage structure arranged and constructed to normally hold said vessel closure member in pressure sealing relation to said vessel in a first position and shiftable therefrom to a second position which allows opening of communication between said pressure vessel and said housing; and
 c. pressure responsive means reactive to increasing pressure within the processing area to shift said over-center linkage from said first to said second position upon a predetermined increase in pressure within the protected area.

13. The device as set forth in claim 12 and said means for controlling communication between said housing and said pressure vessel including a valve plate.

14. The device as set forth in claim 12 and said pressure responsive means by the structure of said canister, selected portions of said canister operatively contacting said over-center linkage for shifting thereof, said canister being slideable with said housing and shifting in response to increase in pressure within the protected area.

15. The device as set forth in claim 12 and said pressure responsive means including a piston slideably mounted within said housing and slideable in response to increase in pressure within the protected area, a selected portion of said piston operatively contacting said over-center linkage for shifting thereof.

16. The device as set forth in claim 12 and means for adjusting said over-center linkage whereby the pressure required to shift the same from said first to said second position is selectively adjustable.

17. The device as set forth in claim 1 and the protected area normally including processing equipment; and,
 a. pneumatically operative switching means arranged in controlling relation to such processing equipment responsive to pressure transmitted thereto; and,
 b. a pressure conduit arranged and constructed to interlink said pressure vessel to said pneumatically operative switching means whereby said switching means will interrupt power to the controlled processing equipment in response to a drop in pressure transmitted thereto from said pressure vessel.

* * * * *